W. F. GOULDING.
Harvester Rake.
No. 100,615. Patented March 8, 1870.
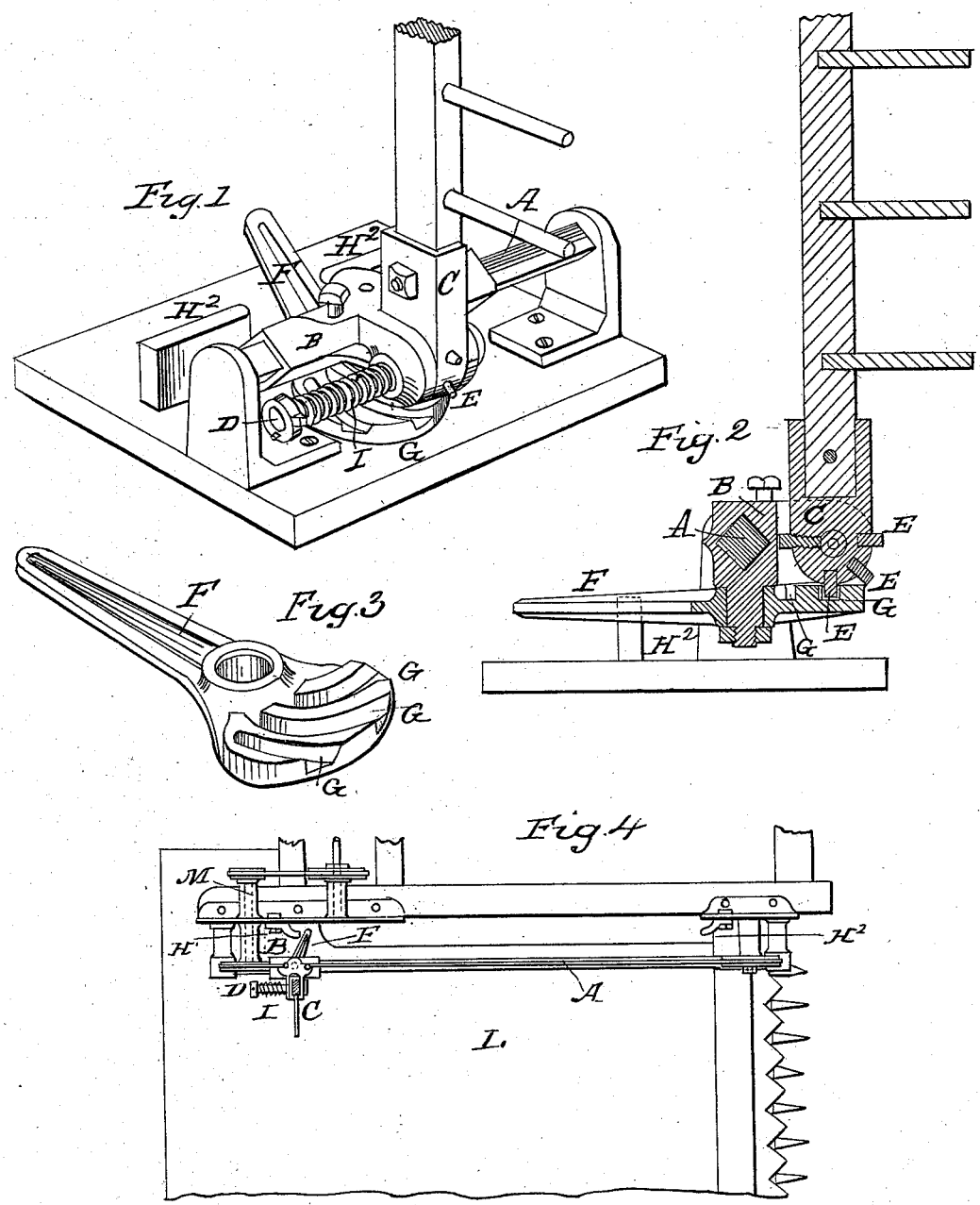

United States Patent Office.

WILLIAM F. GOULDING, OF PROVIDENCE, RHODE ISLAND.

Letters Patent No. 100,615, dated March 8, 1870.

IMPROVEMENT IN HARVESTER-RAKES.

The Schedule referred to in these Letters Patent and making part of the same.

To all whom it may concern:

Be it known that I, WILLIAM F. GOULDING, of the city and county of Providence, and State of Rhode Island, have invented a certain new and useful Harvester-Rake.

My invention relates wholly to certain novel combinations of mechanical devices for producing an even and regular upward and downward movement of harvester-rakes, and is applicable only to that class of machines which may be provided with single rakes, mounted in a rake-head, supported upon sliding bars, or their equivalents, and moving at right angles to, or parallel with the cutter-bar.

And I do hereby declare that the following specification, taken in connection with the drawings furnished and forming a part of the same, is a true, clear, and exact description thereof.

Reference being had to the drawings—

Figure 1 represents in perspective the operative parts of my invention, the same being mounted upon a small platform for the purposes of illustration.

A represents the sliding bar or traverse rail, upon which the carriage and rake-head is mounted. This bar is square by choice, and is firmly attached at each end to suitable standards.

B is the carriage, mounted upon the slide-bar A, which passes through the carriage longitudinally, and to which it is well adjusted.

C is the rake-head, to which the rake is attached.

D is a spindle, on which the rake-head is mounted, between two projecting ears of the carriage. One of its ends projects some distance beyond the ears of the carriage for a purpose hereafter explained.

E is one of three pintles, entering the but of the rake-head on a radiating line with the center of the spindle D, and at right angles to it.

F is a horizontal swinging lever, attached by a pivot to and underneath the carriage B.

G is one of three curved grooves in the upper side of the outer end of the lever. These grooves are fitted with relation to the pintles E on the rake-head C, in such a manner that the movement of the lever to the right or left, causes, by the cam effect of the grooves upon the pintles, a vertical rising or falling of the rake, the outer end of the rake describing the arc of a circle, of which the spindle D would be the center.

H¹ and H² are stop-blocks, firmly placed at proper distances apart, at or near each end of the slide-bar A. Their office is, by resistance to the lever F while the carriage B is still moving, to cause the raising or lowering of the rake.

I is a spiral spring, embracing the protruding end of the spindle D. The outer end of this spring is secured to the end of the spindle, while its other end engages with the carriage B. It is all so arranged that the spring shall counterbalance the weight of the swinging rake, and secure for it at all times an even and easy motion.

Figure 2 represents in vertical cross-section the same as in fig. 1, and more clearly exhibits the lever F and its connection with the pintles E. The various parts are lettered as in fig. 1.

Figure 3 represents in perspective upon a larger scale, the lever F with its grooves G.

Figure 4 represents a portion of a harvester platform, and illustrates a mode of application of my invention.

L is the platform.

The slide-bar A is at right angles to the cutter-bar.

M is the driving-shaft, from which power is communicated to the carriage by means of an endless chain, which passes over a grooved pulley on the end of the shaft, and also over a loose grooved pulley on a stud near the cutter-bar.

To this chain a reciprocating motion is imparted by a proper movement of the shaft M, to which power may be applied in an obvious manner.

Parts are lettered in this as in the other figures.

The operation of my invention is as follows:

The rake being at its farthest point from the cutter-bar and raised to a vertical position, advances toward the cutters upon the slide-bar A, moved by the endless chain attached to the carriage. Just before its arrival at the point nearest the cutter-bar, the lever F engages with the stop-block H², which throws the rake from a vertical to a horizontal position and in contact with the fallen grain.

As the machine progresses, the chain, by its backward or reciprocating movement, conveys the carriage and rake, with the grain on the platform, back to the point of delivery, and just before arriving at the end of the bar A, the lever F engages with the stop-block H¹, which causes the rake to again assume a vertical position, ready for repeating the motions already described.

Having thus described my invention,

I claim as new, and desire to secure by Letters Patent—

1. In combination with the sliding bar A and carriage B, the swinging lever F, provided with cam-grooves, engaging with pintles in the but of the rake-head, and operated by contact with the stop-blocks H, substantially as described, for the purposes specified.

2. In combination with the rake-head C, the balance spring I, arranged to compensate or balance the weight of the rake-arm, substantially as shown and described.

3. In combination with the carriage B, the lever F and stop-blocks H, for operating the rake-head, the spindle D, and balance spring I, substantially as shown and described.

WM. F. GOULDING.

Witnesses:
HENRY MARTIN,
JOHN C. PURKIS.